United States Patent [19]
Coulter et al.

[11] 3,795,781
[45] Mar. 5, 1974

[54] PROCESS FOR ELECTROSLAG WELDING OF CIRCUMFERENTIAL JOINTS

[75] Inventors: William John Coulter; Brian Anthony Graville, both of Lasalle, Quebec, Canada

[73] Assignee: Dominion Bridge Company, Limited, Montreal, Quebec, Canada

[22] Filed: Jan. 3, 1973

[21] Appl. No.: 320,697

[30] Foreign Application Priority Data
Jan. 7, 1972   Canada .............................. 131960

[52] U.S. Cl. ................................ 219/73, 219/126
[51] Int. Cl. .......................... B23k 9/18, B23k 9/12
[58] Field of Search .............................. 219/73, 126

[56] References Cited
UNITED STATES PATENTS

| | | | |
|---|---|---|---|
| 3,211,887 | 10/1965 | Cotterman | 219/73 X |
| 3,433,926 | 3/1969 | Dick | 219/73 X |
| 3,723,696 | 3/1973 | McCall | 219/126 X |
| 3,625,757 | 12/1971 | Wiche | 219/73 |

Primary Examiner—C. L. Albritton
Assistant Examiner—Hugh D. Jaeger
Attorney, Agent, or Firm—Fetherstonhaugh & Co.

[57] ABSTRACT

A method is disclosed for electroslag welding a circumferential seam. The method includes feeding a consumable electrode through a vertical stationary consumable nozzle downwardly into the seam to deposit weld metal in a metal melt pool beneath molten slag, rotating the circumferential seam as the weld metal is deposited in the metal melt pool at a speed sufficient to maintain a reasonably constant level in the metal melt pool relative to the axis of rotation of the circumferential seam, and maintaining a reasonable constant distance between the nozzle and the level in the metal melt pool, the improvement which comprises stopping the rotating circumferential seam after one complete rotation, continuing the feeding of the electrode downwardly into the seam through the vertical stationary consumable nozzle so that the level of the metal melt pool rises and consumes the nozzle thus completing a circumferential welded seam.

9 Claims, 4 Drawing Figures

PROCESS FOR ELECTROSLAG WELDING OF CIRCUMFERENTIAL JOINTS

This invention relates to welding processes such as electroslag welding wherein a molten pool is developed and maintained in a circumferential seam, and more particularly to an improved process for depositing weld metal in a circumferential seal particularly by electroslag welding. The weldable metals used include such materials as steel, ferrous alloys of many types, aluminum and its alloys, copper and copper base alloys and the like.

In making a circumferential weld between workpieces, for example parts of a pressure vessel, by the electroslag method of welding, the workpieces are rotated in relation to the welding head until the initial portion of the weld returns to the welding zone as the final part of the weld is made. In order to complete the circumferential weld, the rotation of the workpieces is stopped and the welding head is raised so that the electroslag welding pool fills in the remaining portion of circumferential seam and extends upwards in what is known as a runoff tab.

The welding head has at least one nozzle for feeding a consumable electrode into the electroslag welding pool. Flux is added to the electroslag pool either in granular form or by use of a flux cored wire to provide a bath of molten slag above a melt pool. In conventional electroslag welding machines the nozzle is generally curved, that is to say it has a 90° bend from the horizontal to the vertical, and may be cooled by water. The electroslag pool is kept in place for a circumferential weld by shoes on the inside and outside of the circumference which form dams to contain the pool. Two types of shoes are available. The first is the sliding type. This provides a shoe on the inside and outside of the workpieces which is connected to the welding head, thus as the welding head is stationary and the workpieces rotate, the electroslag pool is always confined by the sliding shoes.

Another type of shoe is the leapfrog type. In this case a series of shoes are attached to the inside and outside of the workpiece across the circumferential seam and are leapfrogged as the workpiece rotates so that the electroslag pool is always confined by shoes acting as dams. Both the sliding shoes and the leapfrog shoes are water cooled. When steel is being welded the shoes are generally made of copper for ease of cooling. It has been found that if the welding head has a curved nozzle, leapfrog shoes are very difficult to use and in general are impractical as the horizontal portion of the nozzle hingers the leapfrogging of the shoes. Therefore, with a curved nozzle sliding shoes are generally used. Sliding shoes, however, have one disadvantage and that is that the inner and outer surfaces of the workpieces adjacent to the seam must be machined or ground smooth, otherwise leaks occur from the electroslag pool and leaks in the electroslag pool can cause faults to occur in the weld due to the dropping in the level of the electroslag pool.

It is an object of the present invention to provide a method of making a weld in a circumferential seam which does not require the raising of the welding head after the weld has been completed.

It is another object of the present invention to provide a method of making a weld in a circumferential seam which may use reasonably large leapfrog type shoes on the outside of the seam.

According to the present invention there is provided in a method of depositing weld metal in a circumferential seam, which includes feeding a comsumable electrode through a vertical stationary consumable nozzle downwardly into the seam to deposit weld metal in a metal melt pool beneath molten slag, rotating the circumferential seam as the weld metal is deposited in the metal melt pool at a speed sufficient to maintain a reasonably constant level in the metal melt pool relative to the axis of rotation of the circumferential seam, and maintaining a reasonably constant distance between the nozzle and the level in the metal melt pool, the improvement which comprises stopping the rotating circumferential seam after one complete rotation, continuing the feeding of the electrode downwardly into the seam through the vertical stationary consumable nozzle so that the level of the metal melt pool rises and consumes the nozzle thus completing a circumferential welded seam.

In drawing which illustrate embodiments of the invention,

The equipment required for electroslag welding according to the present invention includes a power source having a variable voltage control, and wire feed motors having variable speed control capable of driving feed rolls for feeding a consumable electrode to a nozzle which has a tip located directly above the electroslag pool. A pair of rotating rollers is required for rotating the workpieces at a constant speed. The rollers have infinitely variable speed to adjust for the required welding speed. The speed of the rollers determines the circumferential speed of the workpiece, which is the welding speed. In the case of large diameters the welding speed is around a half an inch per minute, therefore the rotational speed of the workpieces is small.

Figure 1:
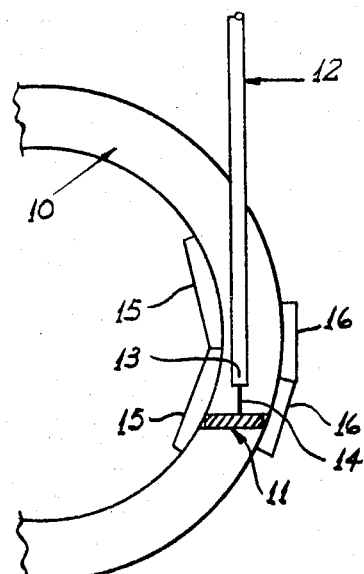
FIGS. 1, 2 and 3 illustrate diagrammatically and in sequence the forming of a weld in a circumferential seam.

Referring now to the drawings, the process of the invention involves welding together the ends of two workpieces such as pipes or cylinders having a large diameter. The end 10 of one of the workpieces appears in FIGS. 1 to 3. The workpieces are set up with a predetermined distance between the ends and are aligned axially on the rollers which rotate the workpieces during welding. The alignment of the ends of the workpieces is generally maintained by welding a number of plates around the circumferential seam. The gap between the ends of the workpieces is preferably between 1 ⅛ inches and 1¼ inch and is maintained by the welded plates, sometimes referred to as strongbacks. A special starting block 11 is positioned in the range from the horizontal plane through the cylindrical axis of the workpiece to an angle below the horizontal plane. The block 11 is located in the range from the horizontal plane through the cylindrical axis to 30° below the horizontal plane. The preferred angle below the horizontal plane for the position of the weld pool is $\theta°$ where $\theta$ is determined from the formula $\cos \theta = D/D + T/2$ where $D$ is the inside diameter of the cylinder and $T$ is the thickness of the wall. If, for example, the cylinder is 4 ft. inside diameter and 2 ins. thick, the preferred angle is 11½°, whereas with 4 ft. inside diameter and 6 ins. thick, the preferred angle is 20°.

At least one consumable nozzle 12 is positioned so that the tip 13 is a predetermined distance above the top of the starting piece 11, and also so that the tip 13 of the nozzle 12 comes in the centre of the starting piece 11 between the inner and outer face of the workpiece. The preferred distance between the tip 13 of the nozzle 12 and the surface of the molten slag is maintained between approximately 1 ½ and 2 ins. If thick material is being welded then several nozzles are used. It is preferable to use one nozzle for approximately every 2 inches of plate. For example, a 6 inch plate requires three nozzles. A consumable electrode 14 is shown leaving the tip 13 of the nozzle 12. Internal shoes 13 are attached to the inner face of the workpieces, and external leapfrog shoes 16 are attached to the outer face of the workpieces so that a boundary is formed surrounding the starting piece 11. The internal shoes may be of any type. For large diameter cylinders it is preferred to have leapfrog shoes as these have been found to be more economical than other types. In small diameter cylinders, a continuous shoe extending around the complete circumference is preferred.

The rotational speed of the workpieces are determined by results. If the weld is laid down too fast, a poor weld occurs which has cracks in the weld. It is preferred to weld at an approximate speed of one half an inch per minute. Beyond this speed, cracking may occur in the weld. Knowing the speed of welding, it is a simple matter for one skilled in the art to calculate the speed of rotation of the workpieces and the rollers. It is also a simple matter to calculate the rate of feeding the consumable electrode to the metal melt pool, as the size of the pool to be filled can be calculated knowing the thickness of the workpieces and the distance between the two ends. The voltage of the power source adjusts the width of the weld. If the voltage is too low, the weld lacks fusion between the weld and the original material. If the voltage is too high, excessive fusion may occur and the slag and molten metal can run out at the edge of the shoe. The process is started by arcing the electrode onto the steel starting piece 11 and then adding flux. The exact formation of the fluxes is proprietry but may be obtained from the companies involved in producing welding equipment. The flux generally includes mixtures of metal oxides such as alumina, silica, magnesia, etc., and calcium fluoride. When molten the flux conducts electricity. The flux melts very shortly after arcing commences to form molten slag and within a few seconds the arc is extinguished and stable electroslag conditions are established. Arcing may be facilitated by inserting a small ball of steel wool between the electrode and the starting block 11 before the current is turned on.

Once the arc is sparked, the consumable electrode is fed through the nozzle 12 until a metal melt pool is formed beneath the molten slag, then the rotation of the workpieces is commenced and the feed of the consumable electrode is adjusted so that the level of the metal pool remains the same throughout the rotation of the workpieces. The depth of the molten slag above the metal melt pool is preferably in the order of 1 to 1 ½ inches, and the depth of the metal melt pool is preferably less than 1 inch. Flux is added intermittently throughout the circumferential weld to maintain the depth of the molten slag as constant as possible. It has been found that it is possible to judge when to add more flux by listening to the sound of the operation. When the noise level rises, more flux must be added. Thus the preferred distance between the tip of the nozzle and the surface of the metal melt pool is in the range of from 2 ½ to 3 ½ inches. If the rotation of the workpieces is stopped, or if the current stops there is poor fusion when the weld recommences, which later has to be gouged out and rewelded. The leapfrog shoes, which are preferably copper, are attached to the outside face of the workpiece across the seam and are water cooled. The inside shoes are attached to the inside face of the workpieces. In the case of steel or ferrous alloy workpieces, the shoes are attached by mild steel clips tack welded to the workpieces or by other similar means.

Figure 2:
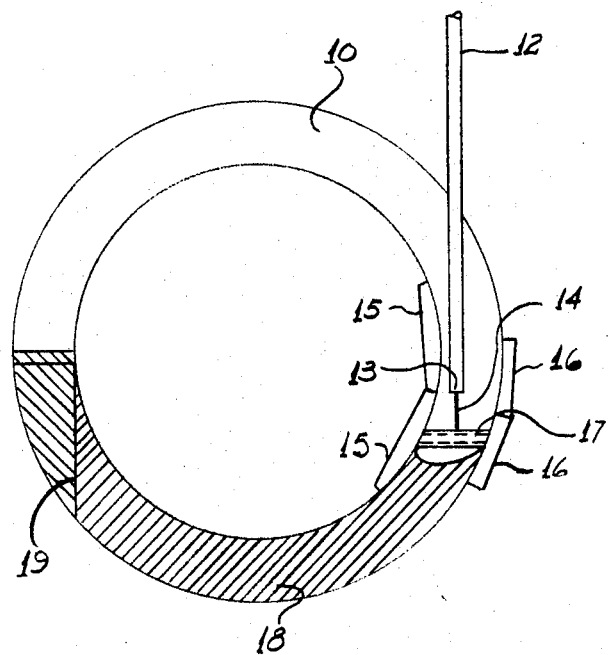

As seen in FIG. 2 the metal melt pool 17 solidifies to form a welded seam 18 as the rotation of the workpieces continue. After approximately half the seam has been welded, the start of the weld is gouged back to approximately tangential to the inner circumference of the workpieces, thus leaving a finished line 19 which is used for the run-off to finish the seam.

Immediately after welding, the cooled portion of the seam may be visually examined for cracks and lack of fusion. The parameters of the welding step may be adjusted to ensure the required parameters are met. Examination by X-ray cannot be carried out during the time the workpiece rotates on the rollers, and any manual repairs due to lack of fusion or cracks in the weld must be carried out after the circumferential weld is completed, and subsequently filled in by electric arc welding generally manual welding.

Figure 3:
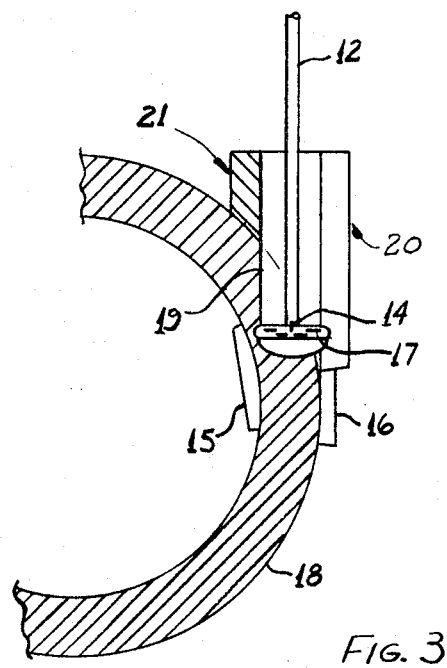

When the rotation of the workpieces reach the position that the gouge line 19 is vertical as shown in FIG. 3, the rotation of the workpieces is stopped. However, the consumable electrode 14 is still fed through the nozzle 12, and thus the metal melt pool 17 slowly rises consuming the nozzle 12 as the level is raised. To contain the metal melt pool 17 as the level rises, a special run-off tab 20 is attached to the front face of the workpieces with an inside block 21 also attached to the front face of the workpieces. The run-off tab 20 and the inside block 21 conbining to contain the metal melt pool as the level rises above the outer circumference of the workpieces. When the metal melt pool reaches a high point so that it is no longer welding on the circumference of the workpieces, the electrode feed is stopped, and the welding current is turned off. After the seam has cooled, the portion of the run-off extending beyond the outer circumference of the workpieces is removed by gouging or burning so the completed seam has a smooth surface substantially following the line of the outer circumference of the workpieces.

Figure 4:
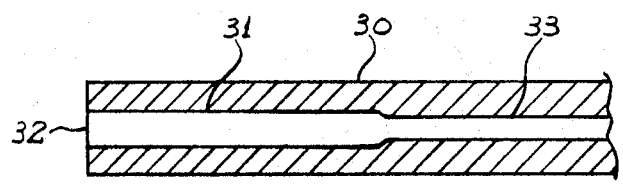
FIG. 4 illustrates a longitudinal cross-section through a tip of a nozzle of the type used in the present invention.

The nozzle 30 as shown in FIG. 4 is specially treated by having a counter bore 31 from its tip 32. The counter bore 31 has a larger diameter than the regular bore 33 of the nozzle 30. The reason for the counter bore 31 is to reduce the effect of spatter from the slag which otherwise tends to allow a slag build-up on the tip of the nozzle interfering with the feeding of the wire to the metal melt pool. For the short distance that the metal melt pool rises in the run-off, the nozzle is being consumed, and the spatter problem does not exist.

The welding head remains stationary throughout the welding of the complete circumferential seam. During the rotation of the workpieces, the level of the metal melt pool remains constant relative to the welding head. The only time the level of the melt pool rises is welding the run-off at the end of the operation when the nozzle is consumed. While the workpieces rotate, the distance between the tip 13 of the nozzle 12 and the level of the metal melt pool 17 remain constant. If the distance varies, then the speed of electrode feed through the nozzle 12 is increased or decreased so that the level of the metal melt pool 17 rises or falls, and the tip of the nozzle always remains at a constant distance from the top of the metal melt pool 17.

In a preferred embodiment, a thermocouple (not shown) is attached to the tip 13 of the nozzle 12. The thermocouple produces a temperature reading which is interpolated to the distance between the tip 13 of the nozzle 12 and the top of the metal melt pool 17. If the temperature is high it means the level of the metal melt pool is too close to the tip of the nozzle, if the temperature is low the level of the metal melt pool is too far from the tip of the nozzle. Thus a thermocouple indicator can advise an operator whether or not he should vary the feed of the consumable electrode to the nozzle. Alternatively, this may be controlled by electronics and the feed speed can be varied so that this temperature remains constant and the space between the tip of the nozzle and the metal melt pool is constant.

Another method of measuring the distance between the nozzle and the metal melt pool is by an austenitic steel dip stick. This is a manual method and requires a certain amount of skill from an operator.

The vertical nozzle allows the welding to be carried out with the metal melt pool preferably located at a preferred angle below the horizontal plane through the cylindrical axis. The consumable electrode is fed to the centre of the metal melt pool and this gives more room to gauge the distance between the tip of the nozzle and the level of the metal melt pool than the more conventional curved nozzles. It also has the advantage of allowing outside shoes to be leapfrogged well in advance of the metal melt pool relative to the rotating workpieces.

EXAMPLE

In a specific example of this process, two mild carbon steel cylinders having an inside diameter of 47 inches and a wall thickness of 2 inches were circumferentially welded together. One nozzle was used for the weld having an outside diameter of five-eighths in. The diameter of the consumable electrode wire was one-eighth in. and the end of the nozzle was drilled out to an internal diameter of seven thirty-secondths in. for a distance of 5 inches.

The welding speed was five-eighths in. per minute with a welding current of 600 amps at 40 volts. The resulting weld was radiographed, sections were cut out and examined and the joint was shown to be free from all defects.

The embodiments of the invention in which an exclusive property or privilege is claimed are defined as follows:

1. In a method of depositing weld metal in a circumferential seam, which includes feeding a consumable electrode through a vertical stationary consumable nozzle downwardly into the seam to deposit weld metal in a metal melt pool beneath molten slag, rotating the circumferential seam as the weld metal is deposited in the metal melt pool at a speed sufficient to maintain a reasonably constant level in the metal melt pool relative to the axis of rotation of the circumferential seam and maintaining a reasonably constant distance between the nozzle and the level in the metal melt pool, the improvement which comprises stopping the rotating circumferential seam after one complete rotation, continuing the feeding of the electrode downwardly into the seam through the vertical stationary consumable nozzle so that the level of the metal melt pool rises and consumes the nozzle thus completing a circumferential welded seam.

2. The method of depositing weld metal in accordance with claim 1 wherein the constant level in the metal melt pool is maintained at the circumferential seam in the range from the horizontal plane through the cylindrical axis of 30° below the horizontal plane.

3. The method of depositing weld metal in accordance with claim 1 wherein the constant level in the metal melt pool is maintained at the circumferential seam at an angle $\theta$ below the horizontal, where $\theta$ is determined from the formula $\cos \theta = D/D + T/2$, where $D$ is the inside diameter of a workpiece having the circumferential seam therein, and $T$ is the wall thickness of the workpiece.

4. The method of depositing weld metal in accordance with claim 3 wherein the reasonably constant distance is maintained between the nozzle and the level in the metal melt pool by sensing the temperature of the metal melt pool from the nozzle, comparing the temperature with a predetermined value and adjusting the speed of feeding the consumable electrode to deposit weld metal in the metal melt pool as necessary so the distance between the nozzle and the level of the metal melt pool is sufficient to maintain the temperature at the predetermined value.

5. The method of depositing weld metal in accordance with claims 1 wherein the distance between the nozzle and the level of the metal melt pool is in the range of from 2 ½ to 3 ½ inches.

6. The method of depositing weld metal in accordance with claim 1 wherein individual welding shoes are leapfrogged on the outside surfaces of the circumferential seam and at least one welding shoe is provided on the inside surfaces so that the melt pool is always contained.

7. The method of depositing weld metal in accordance with claim 1 wherein the circumferential seam is rotated at approximately one half inch per minute.

8. The method of depositing weld metal in accordance with claim 1 wherein the consumable nozzle has a tip which is counter bored to a diameter greater than the regular bore.

9. The method of depositing weld metal in accordance with claim 1 wherein one consumable nozzle is provided for every 2 inch thickness of a workpiece having the circumferential seam therein.

* * * * *